Feb. 16, 1971 H. F. ERTMAN ET AL 3,562,918
APPARATUS FOR CONTOUR MEASUREMENT OF A MEMBER
Filed Feb. 26, 1969 3 Sheets-Sheet 5
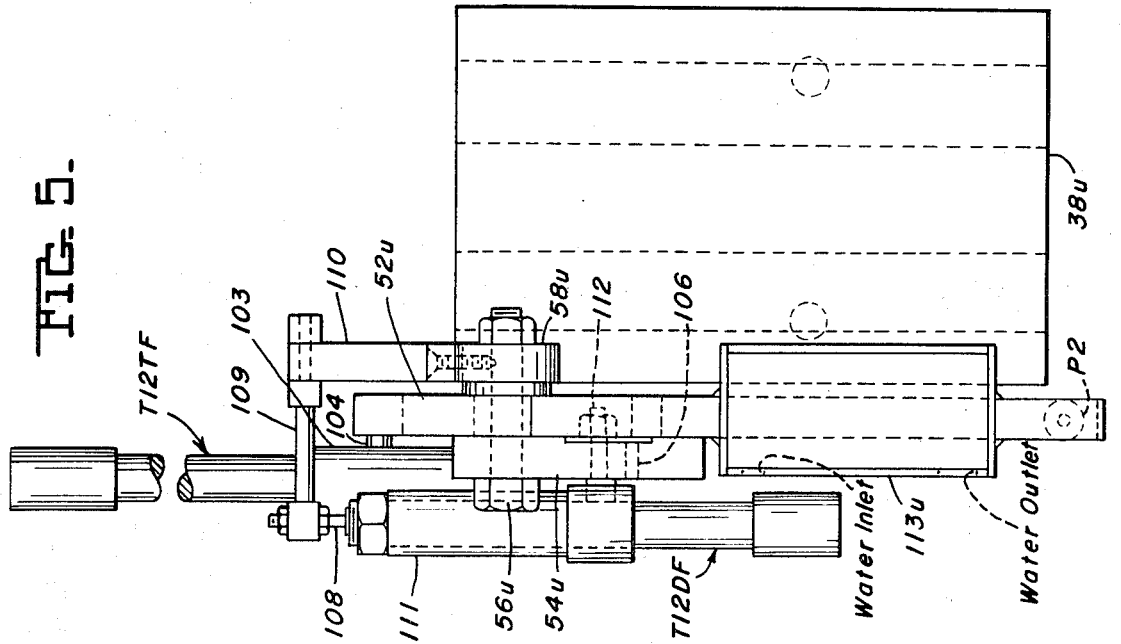
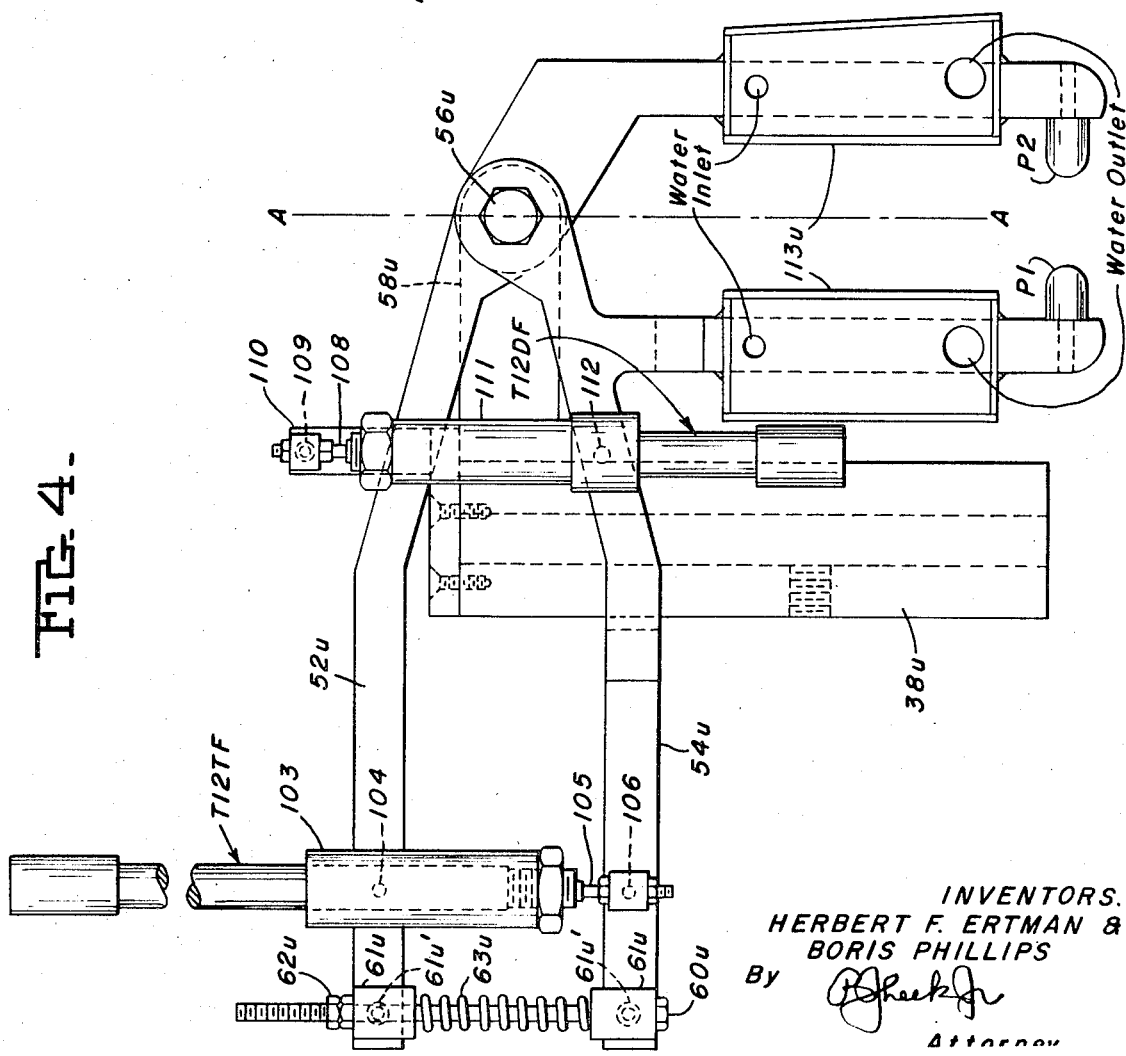
INVENTORS.
HERBERT F. ERTMAN &
BORIS PHILLIPS
By
Attorney

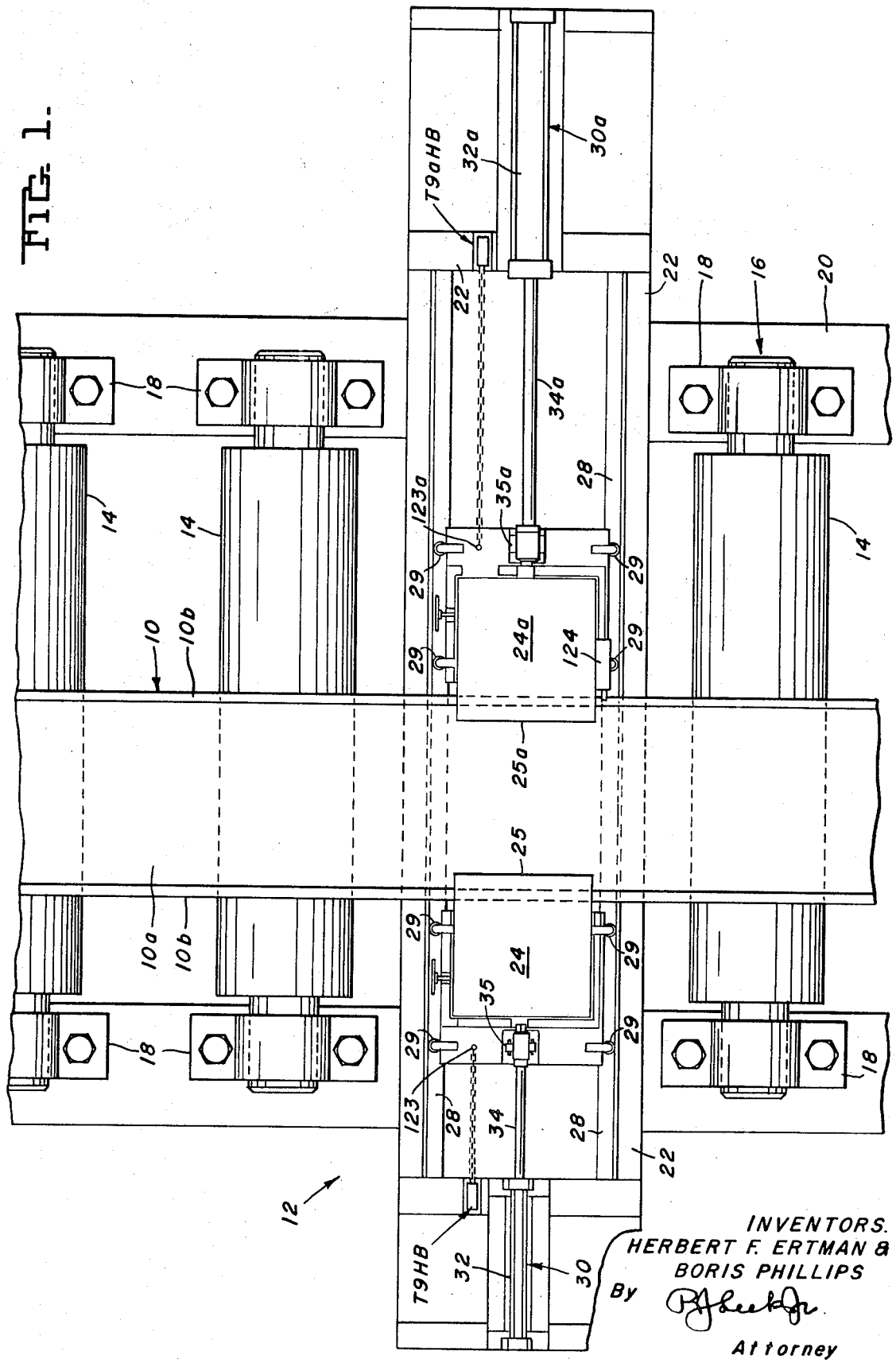

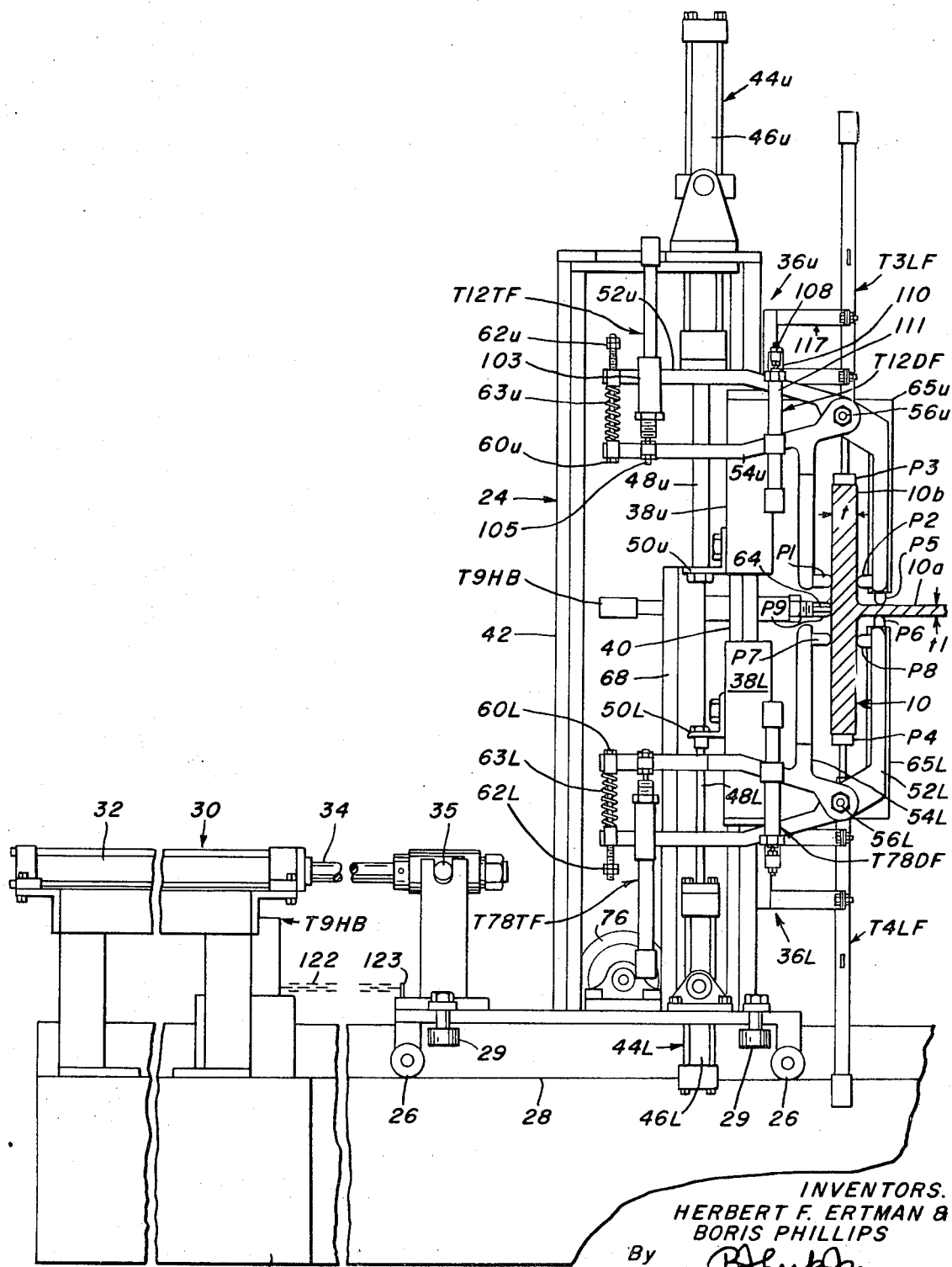

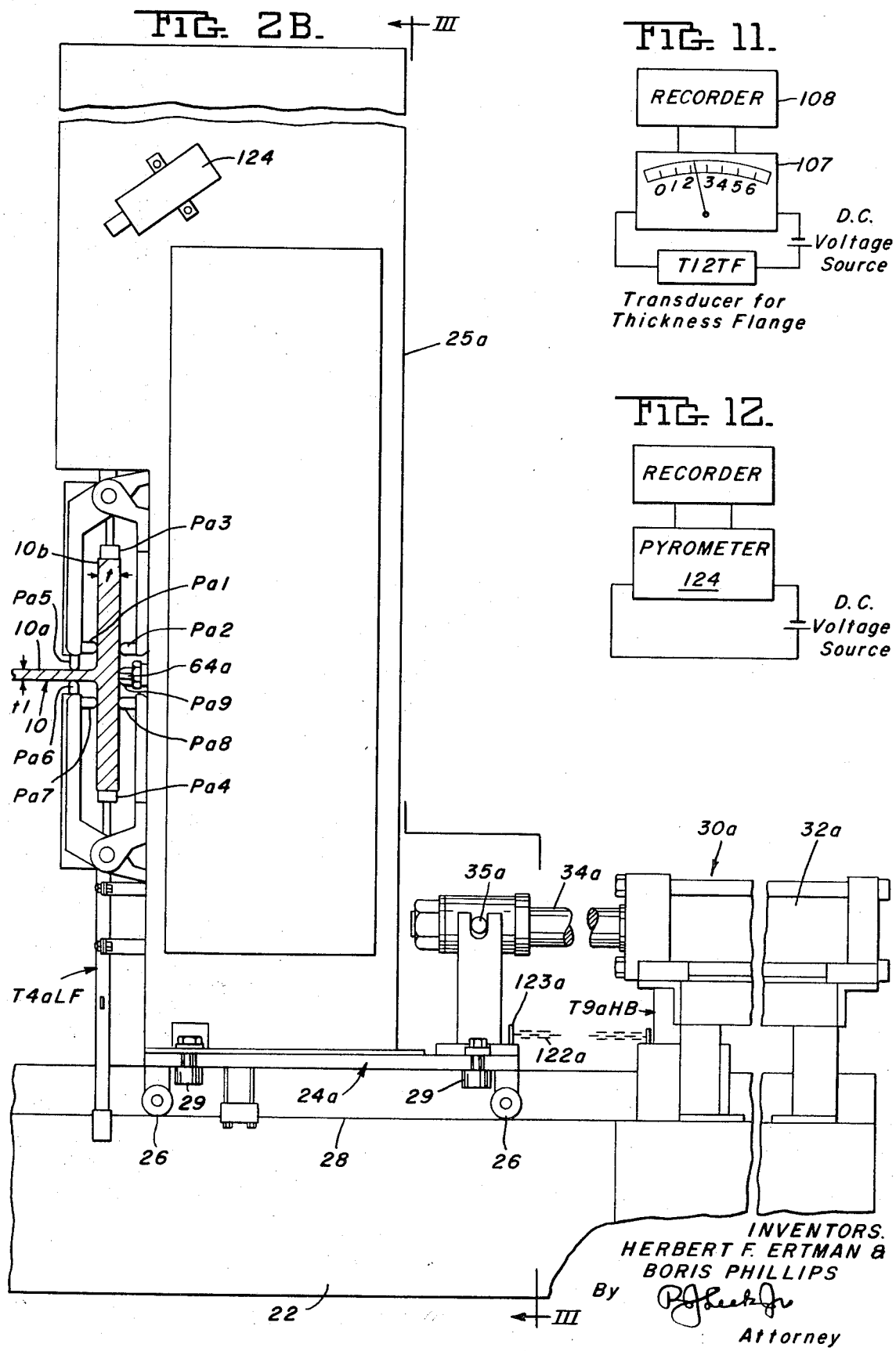

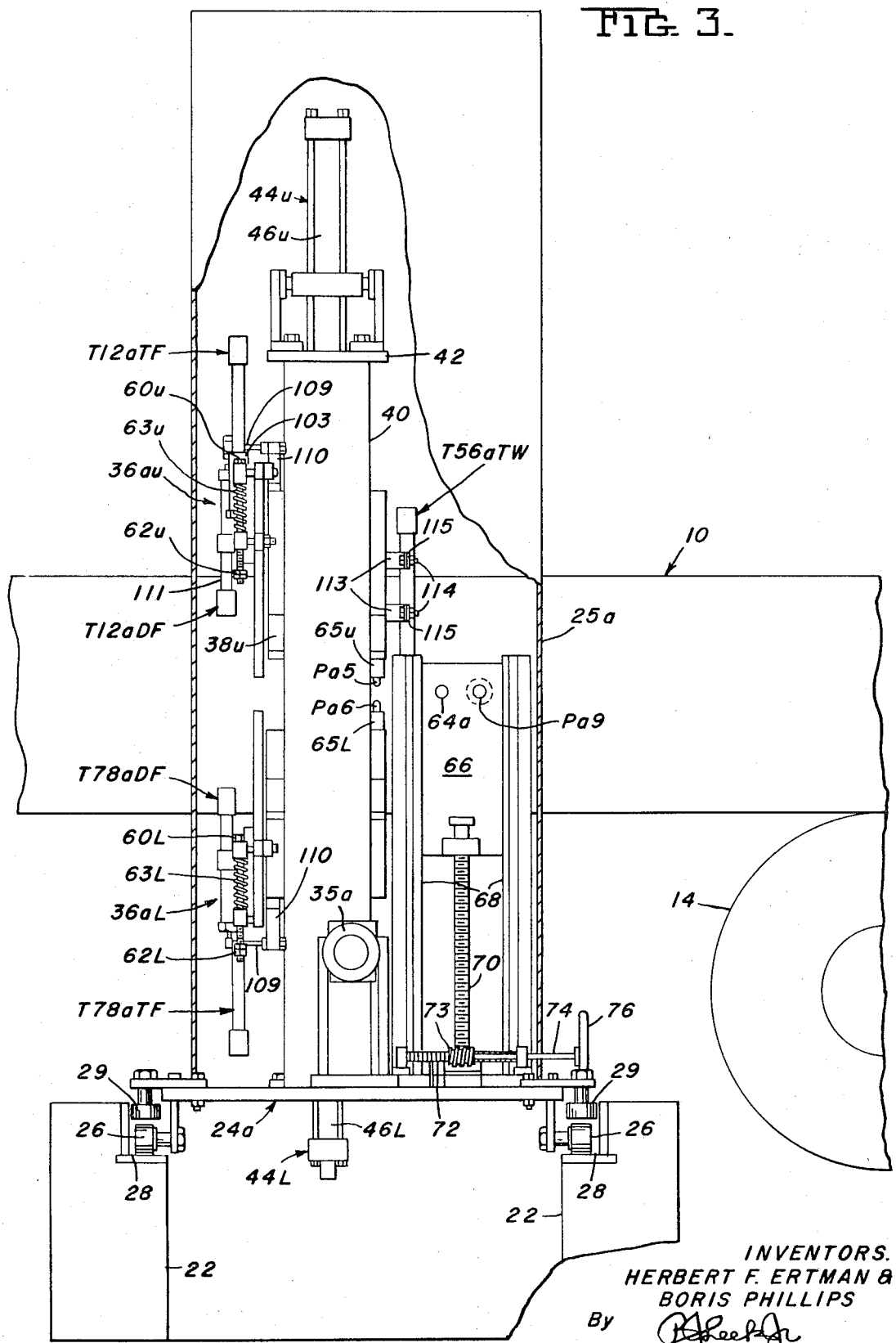

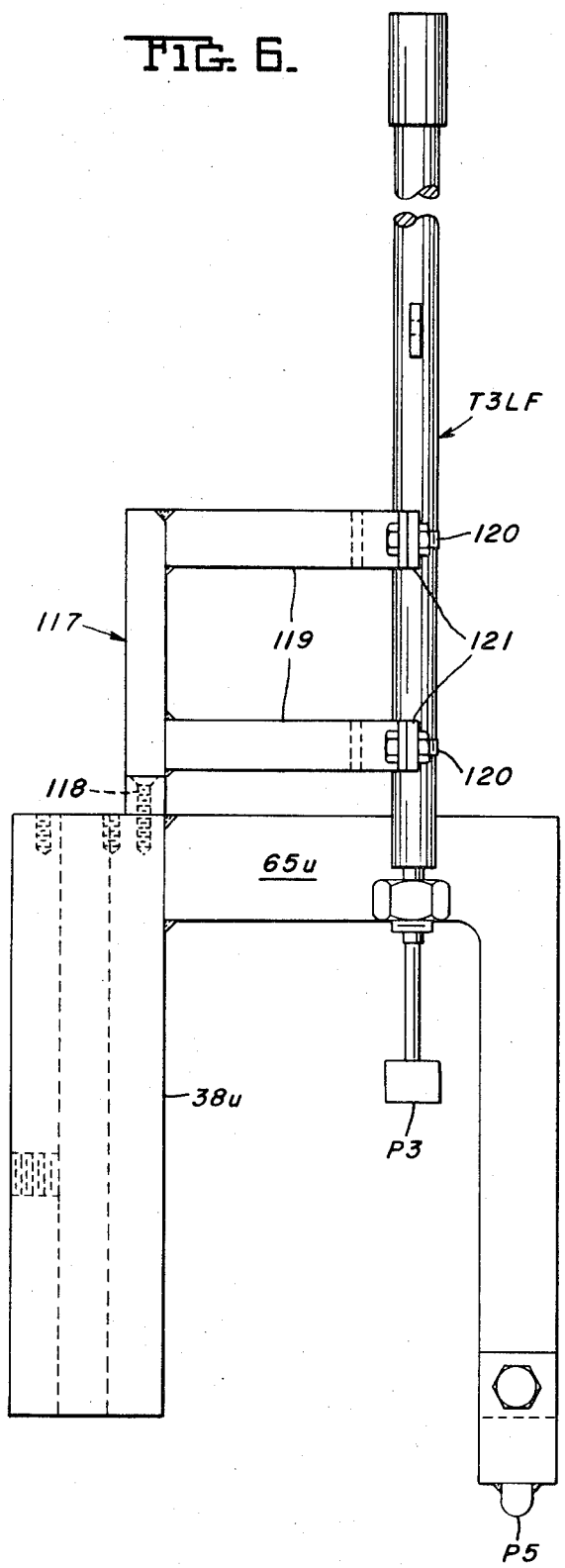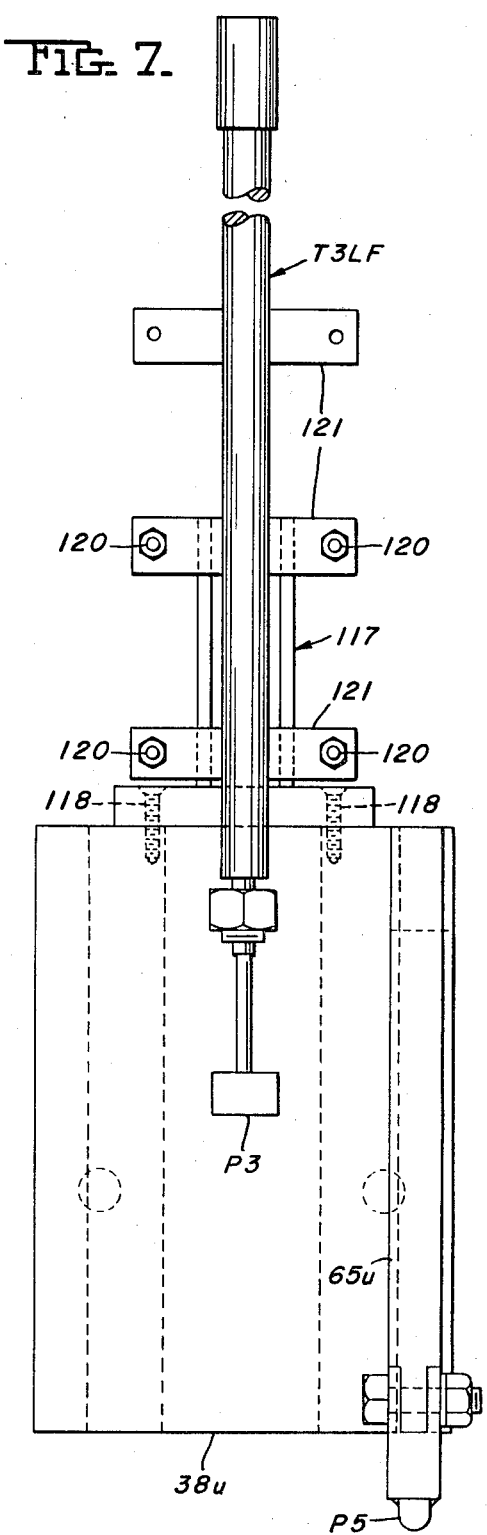

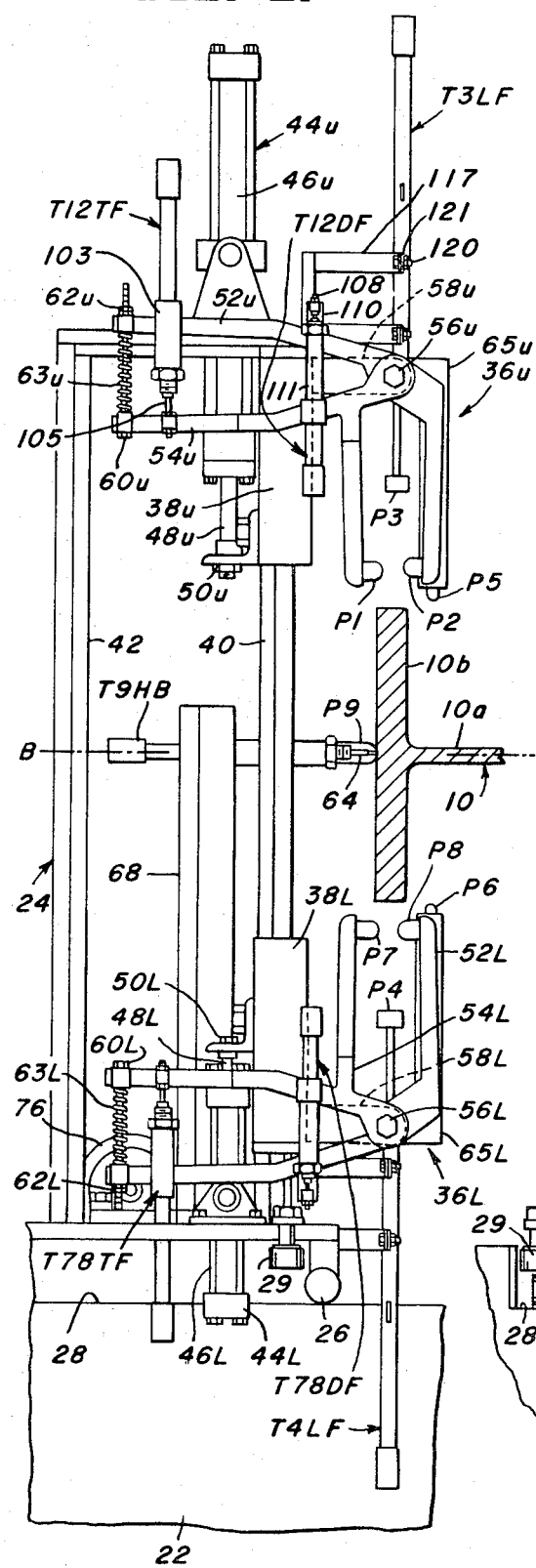
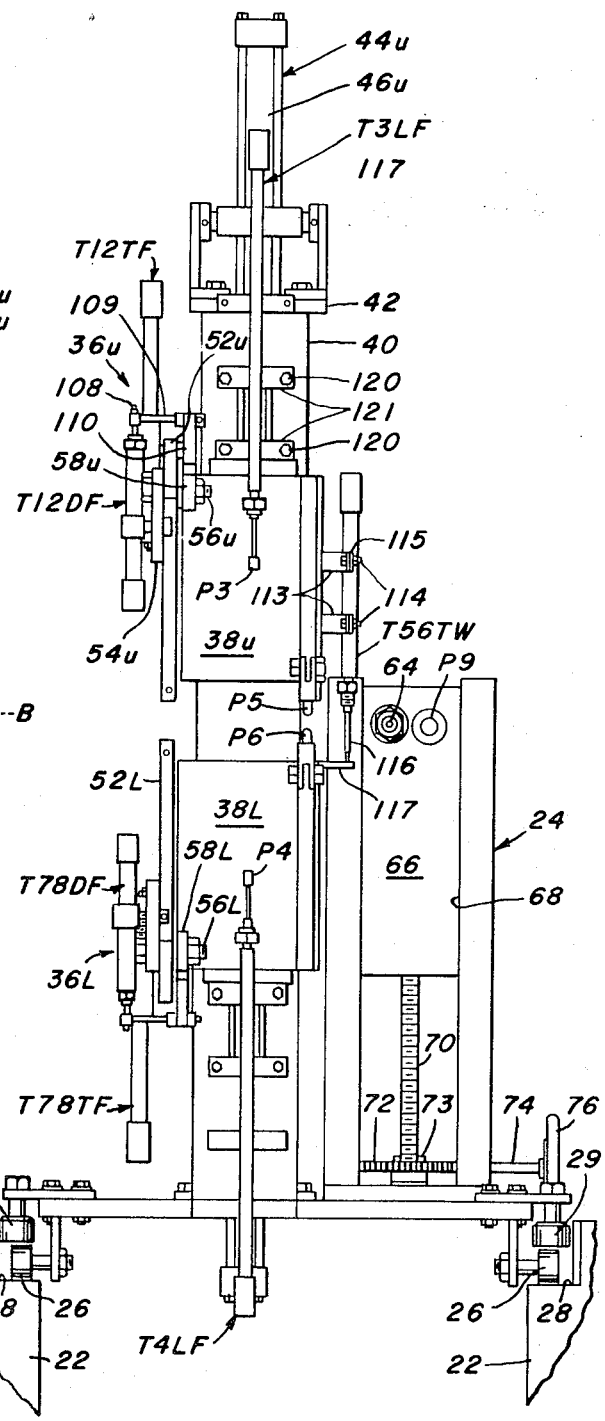

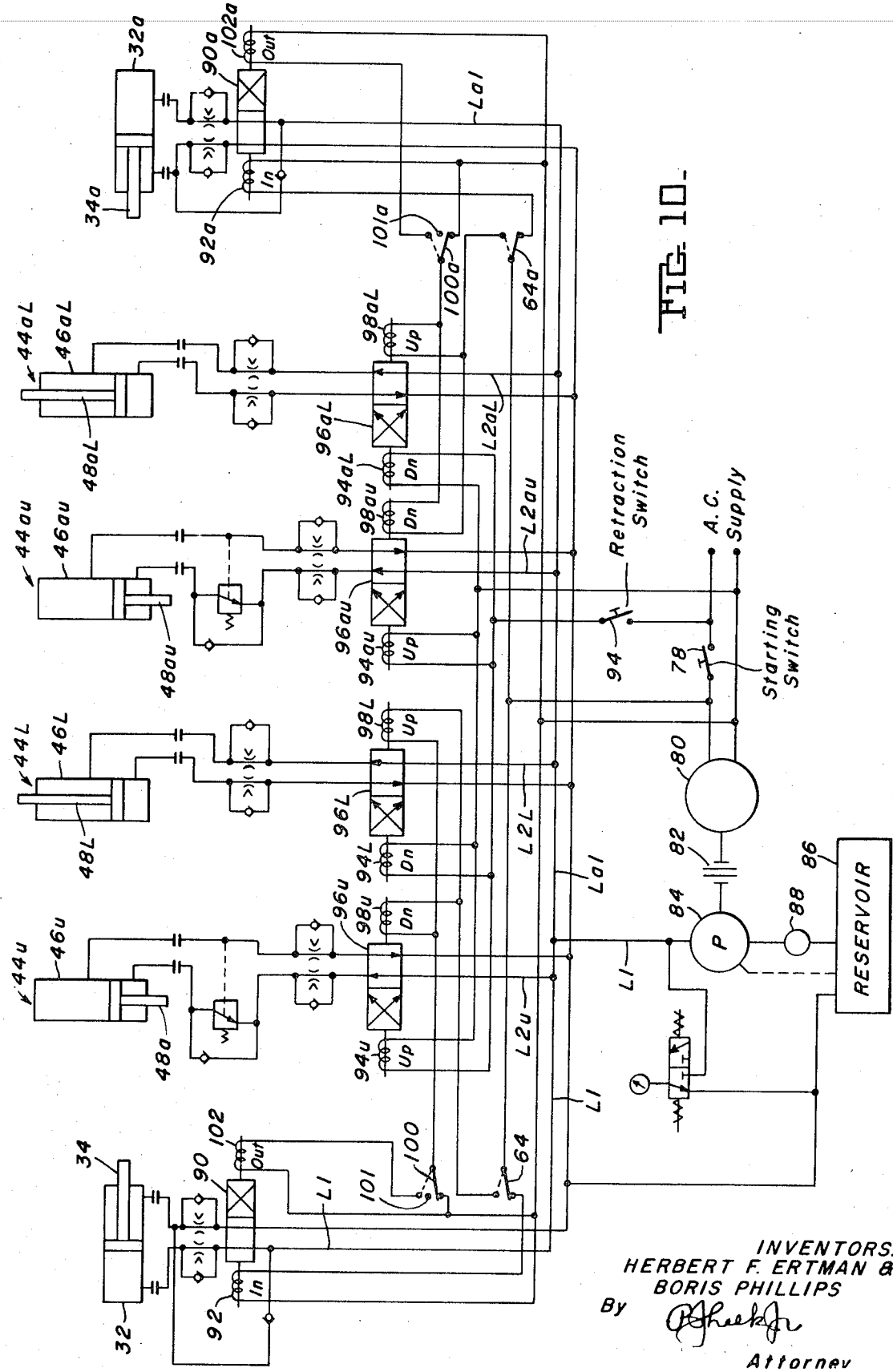

United States Patent Office 3,562,918
Patented Feb. 16, 1971

3,562,918
APPARATUS FOR CONTOUR MEASUREMENT OF A MEMBER

Herbert F. Ertman, Wilkins Township, Allegheny County, Pa., and Boris Phillips, Los Angeles, Calif., assignors to United States Steel Corporation, a corporation of Delaware
Filed Feb. 26, 1969, Ser. No. 802,552
Int. Cl. G01b 5/02
U.S. Cl. 33—174                 16 Claims

ABSTRACT OF THE DISCLOSURE

This invention relates to apparatus for continuously determining a dimension of a member, the apparatus having a frame disposed adjacent the path of movement of the member, a carriage reciprocable on the frame toward and away from the member, drive means connected to the carriage and a sensing assembly on the carriage for continuously measuring the dimension. The sensing assembly has a movable member reciprocable on the carriage toward and away from the dimension, sensing assembly drive means connected to the movable member, a first scanning member and a second scanning member pivoted on the movable member, a first probe on the first scanning member, and a second probe on the second scanning member and biasing means connected to the first scanning member and to the second scanning member for biasing the first probe toward the second probe. A proximity member is on the carriage for detecting the member and is connected to the drive means and the sensing assembly drive means. The proximty member is operable when it engages the member to stop the drive means and movement of the carriage toward the member and to start the sensing assembly drive means thereby causing the sensing assembly to move from an initial position toward the dimension so that the first probe and the second probe engage the member and continuously measure the dimension during movement of the sensing assembly toward the member.

BACKGROUND OF THE INVENTION

Heretofore, a member, such as for example a wide flange beam being formed in a rolling mill, was tested for dimensional accuracy and symmetry of its flanges and webs with respect to a vertical or horizontal axis after such beam had been rolled. It was customary practice for a sample piece, about one foot long, to be cut from the beam while the beam was near the processing or rolling temperature (about 1400° F.), which sample piece was then allowed to cool and upon reaching ambient or room temperature was checked manually for dimensional deviation and symmetry deviation. The cooling and checking period was time consuming and occurred when the original beam had reached a distant point from the sampling point.

Conventional apparatus of this type is shown in the following patents:

| Patent No. | Inventor | Issued |
|---|---|---|
| U.S. 1,814,354 | Webster et al | 7-14-31 |
| U.S. 1,969,536 | Winne | 8-7-34 |
| U.S. 1,977,619 | Boyer et al | 10-23-34 |
| U.S. 2,592,157 | Kendall | 4-8-52 |
| U.S. 2,692,045 | Stalhandske et al | 10-19-54 |
| U.S. 2,748,937 | Casler et al | 6-5-56 |
| U.S. 3,032,192 | Uhlig | 5-1-62 |
| U.S. 3,080,659 | Wolford | 3-12-63 |
| U.S. 3,088,591 | Perthen et al | 5-7-63 |
| U.S. 3,140,545 | Murtland | 7-14-64 |
| U.S. 3,172,311 | Kendall | 3-9-65 |
| U.S. 3,218,066 | Halberschmidt et al | 11-16-65 |
| U.S. 3,247,964 | Doud et al | 4-26-66 |
| U.S. 3,278,023 | Schneider | 10-11-66 |
| British Patent No. 879,277 | Square D Co | 10-11-61 |

OBJECTS OF THE INVENTION

It is the general object of this invention to avoid and overcome the foregoing and other difficulties of and objections to prior art practices by the provision of apparatus for measuring a dimension of a member, which apparatus:

(a) tests the dimensional accuracy and symmetry deviation of the member automatically, (b) determines the required dimensional and symmetry characteristics of the member while such member is at processing temperature and at a test point on the manufacturing line in which the member is being processed, (c) eliminates the cutting of a sample from the member and the associated cooling period for cooling the sample to room temperature, (d) permits the conversion of the test results at processing temperature to test results at room temperature by a calibration chart, (e) is operable to handle a wide range of members and to cover a wide variety of test positions on the member for one fixed position of the apparatus.

(f) is operable to determine tilt, waviness and symmetry of the member, and (g) continuously or contour measures a dimension of the member.

BRIEF SUMMARY OF THE INVENTION

The aforesaid objects of this invention, and other objects which will become apparent as the description proceeds, are achieved by providing apparatus for continuously determining a dimension of a member. The apparatus has a frame disposed adjacent the path of movement of the member, a carriage reciprocable on the frame toward and away from the member, drive means connected to the carriage and a sensing assembly on the carriage for continuously measuring the dimension. The sensing assembly has a movable member reciprocable on the carriage, toward and away from the dimension, sensing assembly drive means connected to the movable member, a first scanning member and a second scanning member pivoted on the movable member, a first probe on the first scanning member, and a second probe on the second scanning member and biasing means connected to the first scanning member and to the second scanning member for biasing the first probe toward the second probe. A proximity member is on the carriage for detecting the member and is connected to the drive means and the sensing assembly drive means. The proximity member is operable when it engages the member to stop the drive means and movement of the carriage toward the member and to start the sensing assembly drive means thereby causing the sensing assembly to move from an initial position toward the dimension so that the first probe and the second probe engage the member and continuously measure the dimension during movement of the sensing assembly toward the member.

BRIEF DESCRIPTION OF THE SEVERAL VIEWS OF THE DRAWINGS

For a better understanding of this invention reference should be had to the accompanying drawings, wherein like numerals of reference indicate similar parts throughout the several views and wherein:

FIG. 1 is a fragmentary plan view of the contour measuring apparatus of this invention and showing a member to be measured positioned on a conveyor adjacent such apparatus;

FIGS. 2A and 2B are continuing side elevational views of the contour measuring apparatus of the present invention and showing in FIG. 2A the left hand carriage without its housing and in FIG. 2B the right hand carriage with its housing thereon, both carriages being in the measuring position and omitting for clarity the conveyor;

FIG. 3 is a side elevational view of the apparatus taken along the line III—III of FIG. 2B in the direction of the arrows;

FIG. 4 is an enlarged fragmentary side elevational view of the upper sensing assembly of the left hand carriage shown in FIG. 2A and omitting for clarity the probe assembly for determining the height of the flange of the structural member, and showing the cooling chambers for the upper flange thickness probe assemblies which chambers were omitted for clarity in FIGS. 2A, 2B, 3, 8 and 9;

FIG. 5 is a side elevational view of the upper sensing assembly shown in FIG. 4 taken from the right hand portion of FIG. 4;

FIG. 6 is an enlarged fragmentary side elevational view of the probe assembly for determining the height of the flange of the structural member;

FIG. 7 is a side elevational view of the probe assembly shown in FIG. 6 taken from the right hand portion of FIG. 6;

FIG. 8 is an enlarged side elevational view of the left hand carriage shown in FIG. 2A and showing such carriage in an initial or retracted or standby position;

FIG. 9 is a side elevational view of the carriage shown in FIG. 8 and showing the web thickness probe assembly;

FIG. 10 is a schematic diagram of the hydraulic system for the apparatus including the drive means for the carriages and the sensing assembly drive means;

FIG. 11 is a schematic view of an indicating means and a recording means connected for example to the sensing assembly for measuring the thickness of the flange of the structural member; and FIG. 12 is a schematic view of a pyrometer type temperature measuring device for measuring the temperature of the structural member and an associated recorder.

Although the principles of this invention are broadly applicable to the continuous contour measuring of a member, this invention is particularly adapted for use in conjunction with a structural member, such as a beam, and hence it has been so illustrated and will be so described.

DETAILED DESCRIPTION

With specific reference to the form of this invention illustrated in the drawings, and referring particularly to FIG. 1, an apparatus for the continuous contour measurement of a structural member, such as beam 10 (FIGS. 1, 2A, 2B, 3 and 8), is indicated generally by the reference numeral 12.

As shown in FIG. 1, the beam 10 having a web 10a and flanges 10b (FIGS. 1, 2A, 2B and 8) is carried by rolls 14 (FIG. 1) of a conveyor 16 (FIG. 1) adjacent the apparatus 12 so that such apparatus 12 may continuously determine a dimension of the beam 10, such as the thickness $t$ (FIGS. 2A, 2B) of the flanges 10b. The rolls 14 of the conveyors 16 are journaled in bearings 18 (FIG. 1) upstanding from a frame 20 (FIG. 1) of the conveyor 16.

The apparatus 12 has a frame 22 (FIGS. 1, 2A, 2B, 3, 8 and 9), such frame 22 being disposed adjacent and transverse to the path of movement of the beam 10. Carriage 24 (FIGS. 1, 2A, 8 and 9) and carriage 24a (FIGS. 2B, 3) are reciprocable on wheels 26 (FIGS. 1, 2A, 2B, 8 and 9) in a track 28 (FIGS. 2A, 2B, 3, 8 and 9) on the frame 22 in opposed alignment toward and away from the beam 10 and are aligned laterally in the track 28 by rollers 29 (FIGS. 1, 2A, 2B, 3, 8 and 9). The carriages 24 and 24a have guards 25 (FIG. 1), 25a (FIGS. 2B, 3). Carriage drive means 30 (FIGS. 1, 2A) and carriage drive means 30a (FIGS. 1, 2B) are connected respectively (FIGS. 1, 2A and 2B) to the carriages 24, 24a. Since the drive means 30, 30a are essentially the same, only the drive means 30 will be described. The drive means 30 has a main drive cylinder 32 (FIGS. 1, 2A) having its piston rod 34 connected to 35 to the carriage 24.

Each carriage 24, 24a is provided with an upper sensing assembly 36$u$ (FIGS. 2A, 8 and 9) and 36$au$ (FIG. 3) respectively, and a lower sensing assembly 36L (FIGS. 2A, 8 and 9) and 36$a$L (FIG. 3) respectively, for continuously measuring a contour dimension, such as the thickness $t$ (FIGS. 2A, 2B) of the flange 10b of the beam 10. Since the sensing assemblies 36$u$, 36$au$ and 36L, 36$a$L are substantially identical it is deemed sufficient to describe only the upper sensing assembly 36$u$.

SENSING ASSEMBLY 36$u$

The sensing assembly 36$u$ has a movable member, such as an upper cross head 38$u$ (FIGS. 2A, 4, 5, 6, 7, 8 and 9) reciprocable in a guide 40 (FIGS. 2A, 8 and 9) on a frame 42 (FIGS. 2A, 8 and 9) of the carriage 24, toward and away from the dimension $t$ (FIGS. 2A, 2B) on the flange 10b of the beam 10. Sensing assembly drive means 44$u$ (FIGS. 2A, 8 and 9), such as a cylinder 46$u$ (FIGS. 2A, 8 and 9) having its piston 48$u$ (FIGS. 2A, 8) secured to the upper cross head 38$u$ at 50$u$ (FIGS. 2A, 8) are provided. Referring to FIGS. 2A, 4, 5, 8 and 9, a first scanning member, upper arm 52$u$, and a second scanning member, lower arm 54$u$ are pivoted at 56$u$ (FIGS. 2A, 4, 5, 8 and 9) on an extension 58$u$ (FIGS. 4, 5, 8 and 9) of upper cross head 38$u$ and carry respectively at one end a first probe P1 (FIGS. 2A, 4 and 8) and a second P2 (FIGS. 2A, 4, 5 and 8) respectively. Biasing means, such as a bolt 60$u$ (FIGS. 2A, 4 and 8), extending through holders 61$u$ pivoted at 61$u'$ on the lower arm 54$u$ and upper arm 52$u$ and secured thereat by nuts 62$u$ (FIGS. 2A, 4 and 8) with a spring 63$u$ (FIGS. 2A, 4 and 8) disposed on the bolt 60$u$ between the arms 54$u$ and 52$u$ bias the first probe P1 toward the second probe P2.

PROXIMITY MEMBER 64

A proximity member, such as the switch 64 (FIGS. 2A, 8 and 9) and a probe P9 (FIGS. 2A, 8 and 9) are mounted on a slide 66 (FIG. 9) adjacent the central portions of the frame 42 of the carriage 24 for detecting the flange 10b of the beam 10 and is connected to the carriage drive means 30 and the sensing assembly means 44$u$ as hereinafter explained in detail. For the purpose of accommodating many sizes of beams 10, the slide 66 is reciprocable in a guide 68 (FIGS. 2A, 8 and 9) by an elevator mechanism having a screw 70 (FIG. 9) upstanding from a pinion gear 72 meshing with a worm 73 on shaft 74 driven by a wheel 76 (FIGS. 2A, 8 and 9).

The switch 64 is operable when the probe P9 engages the flange 10b of the beam 10 to stop the carriage drive means 32 and further movement of the carriage 24 toward the flange 10b and to start the sensing assembly drive means 44$u$ thereby causing the upper sensing assembly 36$u$ to move from the initial or standby position shown in FIG. 8 to the final contour measuring position shown in FIGS. 2A, 9 so that the first probe P1 and the second probe P2 are moved apart when they engage the top of the flange 10b of the beam 10, engage the opposite sides of the flange 10b and continuously contour measure the dimension $t$ during the movement of the upper sensing assembly 36$u$ from the standby position of FIG. 8 to the final measuring position of FIGS. 2A, 9.

Referring to FIGS. 2A, 6, 7 and 8 a probe support 65$u$ extends from the upper cross head 38$u$ and carries a probe P5 (FIGS. 2A, 6, 7 and 8), which probe P5 cooperates with a registering probe P6 (FIGS. 2A, 8) similarly mounted on the lower cross head 38L to measure the thickness $t1$ (FIGS. 2A, 2B) of the web 10a. These probes P5 and P6 also limit the measuring movement of the upper sensing assembly 36$u$, and the lower sensing assembly 36L.

The upper sensing assembly 36$u$ is the first sensing assembly; the lower sensing assembly 36L is the second sensing assembly; the upper sensing assembly 36au associated with the carriage 24a is the third sensing assembly; the lower sensing assembly 36aL associated with the carriage 24a is the fourth sensing assembly; and probes P9, Pa9 form the fifth sensing assembly. The first dimension is the width t of the left hand flange 10b (FIG. 2A) as determined, for example, by the probes P1, P2; the second dimension is the height of the left hand flange 10b (FIG. 2A) and measured by probles P3, P4; the third dimension is the width t of the right hand flange 10b (FIG. 2B) and measured by probes Pa1, Pa2; the fourth dimension is the height of the right hand flange 10b (FIG. 2B) as measured by probes Pa3, Pa4; the fifth dimension is the height of the beam 10 as measured by probes P9, Pa9; and the sixth dimension is the thickness t1 of the web 10a as measured by the probes P5, P6.

DRIVE MEANS 30 AND SENSING ASSEMBLY DRIVE MEANS 44u

Referring to FIG. 10, closure of a starting switch 78 in a power line from an A-C voltage supply energizes a motor 80 coupled by a clutch coupling 82 to a pump 84, which pump 84 pumps fluid, such as oil, from a reservoir 86, through a filter 88 and a line L1 to a first control means, such as a four-way valve 90.

Closure of the starting switch 78 energizes an "in" reverse acting solenoid coil 92 of the valve 90 so that such valve 90 is positioned as shown in FIG. 10 in order to deliver fluid to the left hand end of the cylinder 32 as viewed in FIG. 10 to drive the carriage 24 toward the beam 10. In like manner an "in" reverse solenoid coil 92a is also energized so that line La1 delivers fluid to the right hand end of the cylinder 32a (as viewed in FIG. 10) to move the carriage 24a toward the beam 10.

Simultaneously with the closure of the starting switch 78, a retraction switch 94 (FIG. 10) is closed thus energizing the "up" solenoid coil 94u (associated with the upper sensing assembly 36u); the up solenoid coil 94au (associated with the other upper sensing assembly 36au); the down solenoid coil 94L (associated with the lower sensing assembly 36L); and the down solenoid coil 94aL (associated with the other lower sensing assembly 36aL) so that fluid flows through the lines L2u, L2L, L2au, L2aL and the second control means, such as valves 96u, 96L, 96au and 96aL respectively to the appropriate end of the cylinders 46u, 46L, 46au and 46aL respectively to retract the sensing assemblies 36u, 36L, 36au and 36aL.

When, for example, the probe P9 (FIGS. 2A, 8 and 9 associated with the carriage 24) engages the flange 10b of the beam 10 (FIGS. 2A, 8) the proximity switch 64 (FIGS. 2A, 8, 9 and 10) moves from the solid line position shown in FIG. 10 to the dotted line position shown in FIG. 10, thus deenergizing the "in" reverse acting solenoid coil 92 and energizing the "down" solenoid coil 98u (associated with the valve 96u) and the "up" solenoid coil 98L (associated with the valve 96L) so that fluid enters the cylinders 46u and 46L thereby causing the upper sensing assembly 36u to move down and the lower sensing assembly 36L to move up toward the flange 10b of the beam 10.

Similarly, when the probe Pa9 (FIGS. 2B, 3) on the carriage 24a engages the other flange 10b in like manner the upper sensing assembly 36au moves down and the lower sensing assembly 36aL moves up toward the opposite flange 10b (FIG. 2B) of the beam 10.

When the continuous contour measurement of the flanges 10b is complete as determined by the engagement of the probes P5, P6 and Pa5, Pa6 (FIGS. 2A, 2B, 3, 8 and 9) with the web 10a of the beam 10, switches 100, 100a (FIG. 10) are moved to a neutral position 101, 101a respectively (FIG. 10). Retraction switch 94 (FIG. 10) is closed energizing the "up" solenoid coil 94u, the "down" solenoid coil 94L; the "up" solenoid coil 94au and the "down" solenoid coil 94aL thereby retracting the upper sensing assemblies 36u, 36au and the lower sensing assemblies 36L, 36aL.

Thereafter the switches 100, 100a are moved from the neutral position 101, 101a respectively to the dotted line positions shown in FIG. 10 thereby closing the carriage "out" solenoid circuits with attendant energization of the carriage "out" solenoid coils 102, 102a (FIG. 10) and resultant retraction of the carriages 24, 24a.

SIGNAL MEANS

For the purpose of providing a continuous output signal during the continuous contour measurement of the flange 10b by the probes P1, P2, a first signal means or member, such as a transducer T12TF (FIGS. 2A, 4, 5, 8 and 9), has its cylinder 103 (FIGS. 2A, 4, 5 and 8) pinned at 104 (FIGS. 4, 5) to the upper arm 52u and its piston 105 (FIGS. 2A, 4 and 8) pinned at 106 to the lower arm 54u. The transducer T12TF is similar to one of the models DS1000, DS2000 linear displacement transducers manufactured by Daytronic Corporation, Dayton, Ohio.

Referring to FIG. 11 the output signal from the transducer T12TF is fed to an indicating means, such as a voltmeter 107 which indicates on its calibrated scale the continuous measured contour measurement. The output from the voltmeter 107 is then fed to a strip chart recorder 108 of the Speedomax type G or H manufactured by Leeds and Northrup Co., Philadelphia, Pa.

In order to measure the deviation of the thickness t (of the flange 10b being measured by the probes P1, P2) from a vertical centerline A—A (FIG. 4), a second signal means, a similar transducer T12DF (FIGS. 2A, 4, 5, 8 and 9) has its piston 108 (FIGS. 2A, 4, 5, 8 and 9) mounted on an arm 109 (FIGS. 4, 5 and 9) extending from a rod support 110 (FIG. 5), which rod support 110 (FIGS. 2A, 4, 5, 8 and 9) is screwed to the upper cross head 38u. A cylinder 111 (FIGS. 2A, 4, 5, 8 and 9) of the transducer T12DF is pinned at 112 (FIGS. 4, 5) to the lower arm 54u.

For the purpose of cooling the probe arms 52u, 54u of the probes P1, P2 (FIGS. 4, 5), cooling chambers 113u (FIGS. 4, 5) are provided for all such probe arms except for probe arms 65u, etc., for the probes P5, P6.

In like manner the output signals from the transducer T12DF may be fed to a voltmeter (not shown) similar to the voltmeter 107 (FIG. 11) and thence to a recorder (not shown) similar to the recorder 108 (FIG. 11).

From the above description it will be apparent to those skilled in the art that the first sensing assembly 36u utilizes the probes P1, P2 to continuously contour measure the thickness t of the upper portion of the left hand flange 10b (FIG. 2A) of the beam 10. The transducer T12TF produces an electric signal which continuously measures this thickness t and the transducer T12DF measures the deviation of the upper portion of the left hand flange 10b (FIG. 2A) from a vertical axis, such as A—A (FIG. 4). This contour measurement, other continuous contour measurements and additional measurements performed by the apparatus 12 are summarized in the following table and will be discussed in detail thereafter:

| Probes | Transducer | Measurement |
| --- | --- | --- |
| P1-P2 | T12DF; T12TF | Deviation and continuous contour measurement of upper left hand flange 10b (Figure 2A). |
| Pa1-Pa2 | T12aDF; T12aTF | Deviation and continuous contour measurement of upper right hand flange 10b (Figure 3). |
| P7-P8 | T78DF; T78TF | Deviation and continuous contour measurement of lower left hand flange 10b (Figures 2A, 8 and 9). |
| Pa7-Pa8 | T78aDF; T78aTF | Deviation and continuous contour measurement of lower right hand flange 10b (Figure 3). |
| P5-P6 | T56TW | Thickness of left hand portion of web 10a (Figures 3, 9). |
| Pa5-Pa6 | T56aTW | Thickness of right hand portion of web 10a (Figure 3). |
| P3-P4 | T3LF; T4LF | Height of left hand flange 10b (Figures 2A, 6, 7, 8 and 9). |
| Pa3-Pa4 | (¹) | Height of right hand flange 10b. |
| P9-Pa9 | T9HB; T9aHB | Height of the beam 10 (Figures 2A, 2B and 8). |

¹ Not shown but similar to T3LF and T4LF.

THICKNESS t1 OF THE WEB 10a

The thickness t1 (FIG. 2A) of the left hand portion of the web 10a is sensed by the probes P5–P6, and the associated transducer T56TW (FIG. 9) is mounted by arms 113 (FIG. 9) extending from the right side of the upper cross head 38u and is bolted at 114 (FIG. 9) to flange 115 (FIG. 9) on the transducer T56TW, the lower rod end 116 (FIG. 9) of the transducer T56TW engaging a stop 117 (FIG. 9) on the upper portions of the lower cross head 38L.

The thickness t1 of the right hand portion of the web 10a (FIG. 2B) is similarly sensed by the probes Pa5–Pa6 (FIG. 2B) and measured by a transducer (not shown) but similar to transducer T56TW. The measurement from the transducers T56TW, etc., also indicates the deviation of the web 10a from a horizontal center line B—B (FIG. 8).

HEIGHT OF THE FLANGES 10b

Referring to FIGS. 2A, 6, 7 and 9, an arm assembly 117 is secured by screws 118 to the upper portions of the upper cross head 38u. Arms 119 (FIGS. 6, 7, 8 and 9) of the arm assembly 117 are secured by bolts 120 to flanges 121 of transducer T3LF (FIG. 2A) which transducer T3LF carries the probe P3 (FIGS. 2A, 6, 7, 8 and 9) and cooperates with the transducer T4LF (carrying the probe P4, FIGS. 2A, 8 and 9) similarly mounted on the lower cross head 38L to measure the height of the left hand flange 10b (FIG. 2).

In like manner the probes Pa3, Pa4 (FIG. 2B) sense the height of the right hand flange 10b (FIG. 2) and transducers (not shown) similar to transducers T3aLF and transducer T4aLF measure such height.

HEIGHT OF THE BEAM 10

As shown in FIGS. 2A, 2B, the probes P9, Pa9 respectively on the slides 66 etc., (FIGS. 3, 9) on their respective carriages 24, 24a sense the height of the beam 10. Potentiometer displacement type transducers T9HB (FIGS. 1, 2A) at the side of the main drive cylinder 30 and T9aHB (FIGS. 2, 2B) on the frame 22 have extensible chains 122, 122a respectively extending from their respective transducers T9HB, T9aHB to a securement point 123, 123a on the respective carriages 24, 24a. The displacement of the chains 122, 122a cause the transducers T9HB, T9aHB to measure the height of the beam 10. These potentiometer displacement type transducers T9HB, T9aHB are similar to model 4046 displacement transducer, manufactured by R. I. Research Incorporated, Minneapolis, Minn.

TEMPERATURE MEASUREMENT

As shown in FIGS. 1, 2B and 12, a pyrometer 124 is mounted on one of the carriages 24, 24a (in this case carriage 24a) and is connected (FIG. 12) to a Speedomax G or H strip chart millivolt recorder manufactured by Leeds & Northrup Co., Philadelphia, Pa. The measured temperature, about 1400° F., enables calibration of the measured temperature readings to room temperature readings.

SUMMARY OF THE ACHIEVEMENTS OF THE OBJECTS OF THE INVENTION

It will be recognized by those skilled in the art that the objects of this invention have been achieved by providing a continuous contour measuring apparatus 12 for determining, for example, a dimension $t$ (i.e. the thickness) of the flange 10b of a member 10 which apparatus 12 tests the dimensional accuracy of any dimension, such as the flange thickness $t$ of the member 10, and the symmetry deviation of the member 10 automatically; accomplishes this at the operating temperature (about 1400° F.) of the member 10 and at a test point on the conveyor 16; eliminates the cutting of a sample from the member 10 and the cooling of the member 10 to room temperature before measurement of the member 10; permits the conversion of the high temperature measurements on the member 10 to room temperature measurements by calibration; is operable to handle a wide range of sizes of members 10 and covers a wide range of test areas on the member 10 while in a fixed position with respect to the conveyor 16; and is operable to test tilt, waviness and symmetry of the member 10.

While in accordance with the patent statutes a preferred embodiment of this invention has been illustrated and described in detail, it is to be particularly understood that the invention is not limited thereto or thereby.

We claim:

1. Apparatus for continuously determining a dimension of a member as it moves along a path, said apparatus having:
   (a) a frame disposed adjacent the path of movement of said member,
   (b) a carriage reciprocable on said frame toward and away from said member,
   (c) drive means connected to said carriage,
   (d) a sensing assembly on said carriage for continuously measuring said dimension, said sensing assembly having:
      (1) a movable member reciprocable in said carriage, toward and away from said dimension,
      (2) sensing assembly drive means connected to said movable member,
      (3) a first scanning member and a second scanning member pivoted on said movable member,
      (4) a first probe on said first scanning member, and a second probe on said second scanning member,
      (5) biasing means connected to said first scanning member and to said second scanning member for biasing said first probe toward said second probe,
   (e) a proximity member on said carriage for detecting said member and connected to said drive means and to said sensing assembly drive means,
   (f) said proximity member being operable when it engages said member to stop said drive means and movement of said carriage toward said member and to start said sensing assembly drive means thereby causing said sensing assembly to move from an initial position toward said dimension so that said first probe and said second probe engage said member and continuously measure said dimension during movement of said sensing assembly toward said member.

2. The apparatus recited in claim 1 wherein said proximity member is mounted on an elevator mechanism for positioning said proximity member on said carriage relative to said member.

3. The apparatus recited in claim 1 and having a second carriage reciprocable on said frame in opposed alignment with said carriage toward and away from said member.

4. The apparatus recited in claim 1 and having a second sensing assembly on said first carriage for continuously measuring a second dimension of said member, and reciprocable on said first carriage toward and away from said second dimension in opposed alignment with said sensing assembly.

5. The apparatus recited in claim 3 and having a third sensing assembly on said second carriage for continuously measuring a third dimension of said member and reciprocable on said second carriage toward and away from said third dimension.

6. The apparatus recited in claim 5 and having a fourth sensing assembly on said second carriage for continuously measuring a fourth dimension of said member and reciprocable on said second carriage toward and away from said fourth dimension in opposed alignment with said third sensing assembly.

7. The apparatus recited in claim 1 and having a first signal means on said sensing assembly and operable to produce a first output signal during the continuous contour measurement of said first dimension.

8. The apparatus recited in claim 7 and having an indicating means connected to said first signal means for receiving said first output signal from said first signal means and for indicating said dimension.

9. The apparatus recited in claim 1 and having a second signal means on said sensing assembly and operable to produce a second output signal during the continuous contour measurement of said dimension, which second output signal is proportional to the deviation of said dimension from a predetermined center line.

10. The apparatus recited in claim 1 and having a fifth sensing assembly on said carriage and on said second carriage for measuring a fifth dimension of said member, as said carriage and said second carriage reciprocate toward and away from said member.

11. The apparatus recitetd in claim 10 and having elevator means on said carriage and said second carriage and associated with said fifth sensing assembly for aligning said fifth sensing assembly with said fifth dimension.

12. The apparatus recited in claim 1 wherein said drive means is of the hydraulic type and has a first control means for controlling the reciprocable movement of said carriage.

13. The apparatus recited in claim 1 wherein said sensing assembly drive means has a second control means for controlling the movement of said sensing assembly.

14. The apparatus recited in claim 1 and having a first signal member associated with said first probe and said second probe.

15. The apparatus recited in claim 14 and having an indicating means connected to said first signal member for indicating the continuous contour measurement.

16. The apparatus recited in claim 15 and having recording means connected to said indicating means for recording said continuous contour measurement.

References Cited

UNITED STATES PATENTS

| | | | |
|---|---|---|---|
| 2,885,787 | 5/1959 | Gray et al. | 33—174L |
| 3,065,415 | 11/1962 | Slamar | 33—147(L)X |

SAMUEL S. MATTHEWS, Primary Examiner

U.S. Cl. X.R.

33—147